April 18, 1961 R. W. SONNENFELDT 2,980,762

COLOR TELEVISION RECEIVER COLOR DEMODULATION APPARATUS

Filed May 8, 1956 2 Sheets-Sheet 1

INVENTOR.
RICHARD W. SONNENFELDT
BY Olin D. Mitchell
ATTORNEY

COLOR TELEVISION RECEIVER COLOR DEMODULATION APPARATUS

Filed May 8, 1956

INVENTOR.
RICHARD W. SONNENFELDT
BY
Orin D. Mitchell
ATTORNEY 2,980,762

COLOR TELEVISION RECEIVER COLOR DEMODULATION APPARATUS

Richard W. Sonnenfeldt, Haddonfield, N.J., assignor to Radio Corporation of America, a corporation of Delaware Filed May 8, 1956, Ser. No. 583,464

8 Claims. (Cl. 178—5.4)

The present invention relates to circuits for deriving color difference signal information from the chrominance signal in a color television receiver.

The present color television signal includes a chrominance signal wherein are contained modulations representative of a plurality of color difference signals, each at a specified phase of the chrominance signal. One or more of the color difference signals may be demodulated from the chrominance signal by synchronous demodulation, that is, by mixing the chrominance signal with a demodulating wave having a phase related to the phase of the chrominance signal wherein is contained the desired color difference signal information. In order that demodulating signals of proper phase can be generated in circuits remote from the source of color television signals, color synchronizing bursts indicating reference phase information, are included during each horizontal retrace interval of the color television signal.

Color difference signal demodulation is often performed in product detectors, that, synchronous demodulators, which, having nonlinear characteristics, form the product of the chrominance signal and the demodulating signal and therefrom derive the desired color difference signal. When the frequency of the demodulating signal is the same as the mean frequency of the chrominance signal, that is, 3.58 mcs., the mixing or product detection action often develops distortion components of appreciable magnitude.

It is therefore an object of the present invention to provide means to demodulate color difference signal information with reduced distortion.

According to the invention, a chrominance signal is synchronously demodulated with a demodulating signal whose frequency is a subharmonic of the frequency of the chrominance signal and having a phase corresponding to the phase in the chrominance signal of the color difference signal to be demodulated.

In one form of the present invention, the chrominance signal is subjected to product detection with a demodulating signal or reference signal having one half the mean or subcarrier frequency of the chrominance signal.

Figure 1:
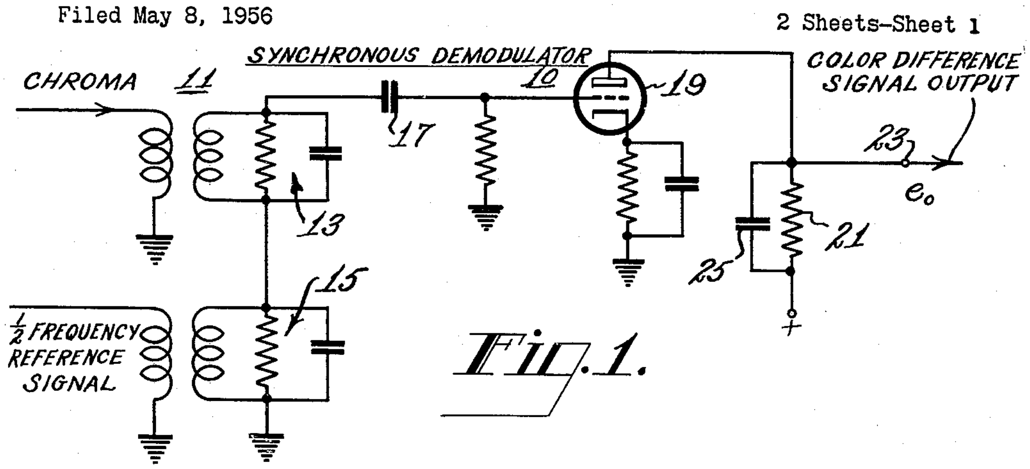
Figures 2, 3:
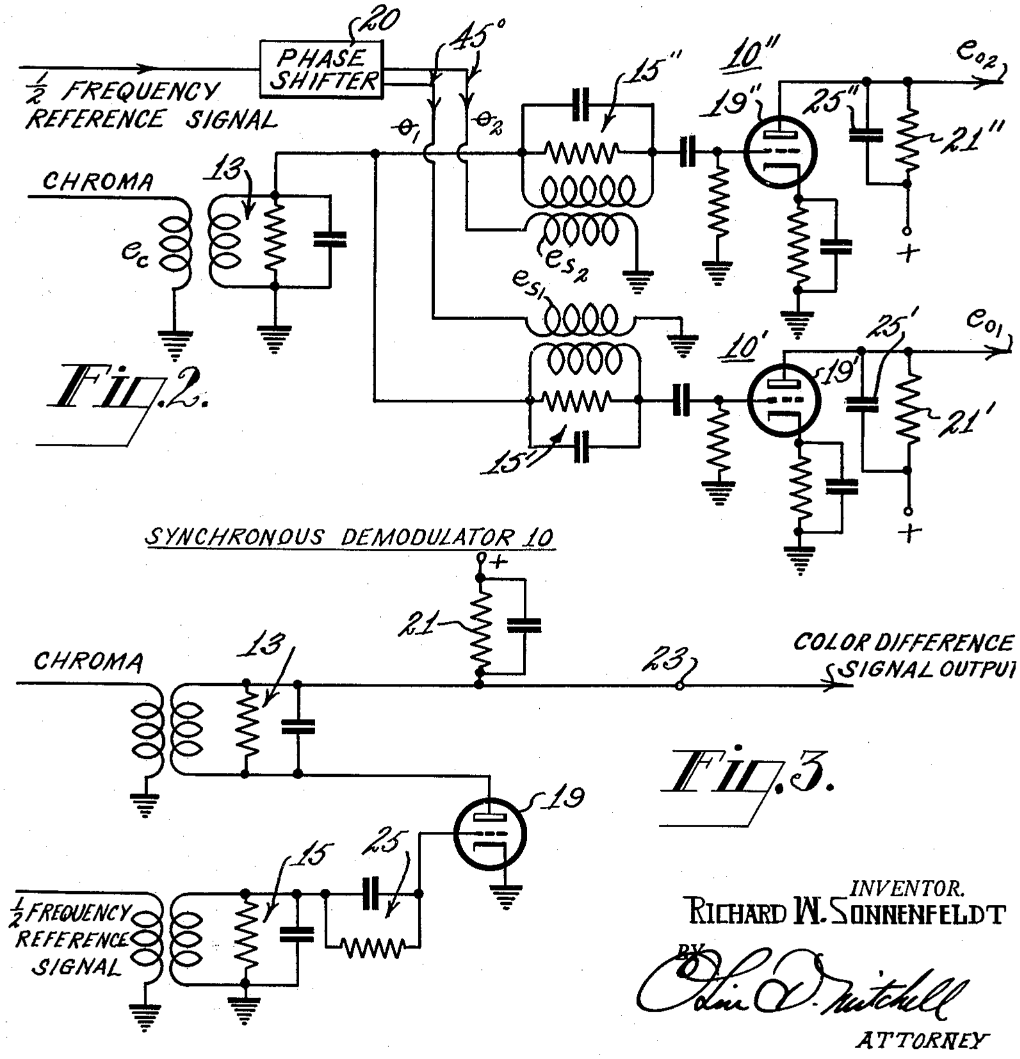
Figures 4, 5:
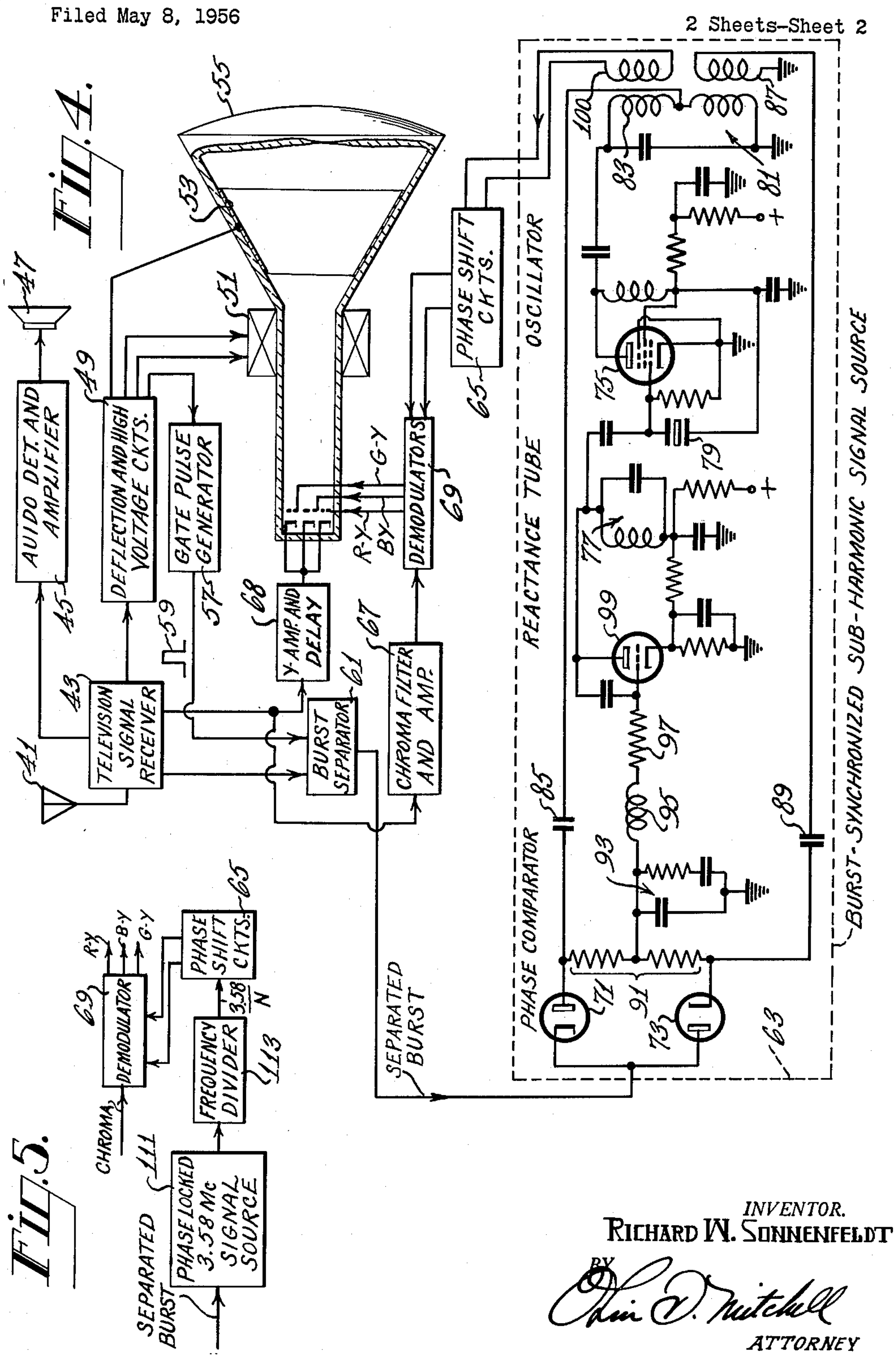

Other and incidental objects of the present invention will become apparent upon a reading of the following specification and a study of the drawings, wherein:

Figures 1, 2, and 3 are schematic diagrams of synchronous demodulators of the present invention;

Figure 4 is a diagram of a color television receiver including a schematic diagram of a burst synchronized subharmonic signal source; and Figure 5 is a diagram of a form of the present invention using a frequency divider.

Figure 1 is a schematic diagram of a synchronous demodulator 10 which illustrates one form of the present invention. A chrominance signal alternatively referred to as chroma, is applied to the primary winding of the transformer 11 which has a resonant circuit 13 having a bandwidth sufficiently wide to develop a prescribed frequency range of the chrominance signal. For some color television receivers this frequency range may extend from 2.2 to 4.2 mcs. A demodulating signal, alternatively referred to in the specification to follow as a reference signal, is used to drive the resonant circuit 15; resonant circuit 15 is sharply resonant at half the frequency of the chrominance signal subcarrier. The chroma is a modulated subcarrier having a subcarrier of 3.58 mcs. The reference signal has a frequency of one half the chroma subcarrier frequency, that is, 1.79 mcs.

Resonant circuits 13 and 15 are connected serially with the resulting circuit coupled by way of condenser 17 to the control grid of tube 19. The chroma and the half-frequency reference signal are thereupon mixed in the electron flow of tube 19; that is, a product signal of the chroma and the reference signal, is produced by tube 19 due to the nonlinear relationship between grid voltage and plate current; the product signal is developed across the output resistor 21 and therefore at the output terminal 23. A condenser 25 is connected across the output resistor to bypass signal information in the frequency range of the chroma and of the reference signal so that this information will be of insignificant amplitude at the output terminal 23.

The operation of the synchronous demodulator 10 may be further understood by considering the following mathematical development. Let the chroma developed across the resonant circuit 13 be referred to as $e_c$ where $$e_c = A \sin(\omega_c t + \phi) \quad (1)$$

and let the reference signal developed across resonant circuit 15 is denoted as $e_s$ where $$e_s = B \sin(\tfrac{1}{2}\omega_c t + \theta) \quad (2)$$

$\phi$ and $\theta$ are phase angles; $\omega_c$ is the angular frequency of the chroma subcarrier. The coefficient A represents the time varying modulation of the chroma subcarrier. The coefficient B is a substantially constant factor.

Let the plate current of the tube 19 be expressible as $$i_p = a_0 + a_1 e_g + a_2 e_g^2 + \ldots \quad (3)$$

where $a_0, a_1 \ldots$ are constants and $e_g$ is the grid voltage; that is, $$e_g = e_c + e_s \quad (4)$$

It follows, using Equations 1 and 2, that the plate current of tube 19 contains the low frequency components $$i_p \cong a_2\left[\frac{A^2}{2} + \frac{B^2}{2}\right] \pm \frac{a_3 B^2 A}{4} \sin(\phi - 2\theta) \quad (5)$$

which describe the demodulated information. The last term of Equation 5 is the desired demodulated signal. The term $$\frac{B^2}{2}$$

is a constant. The term $$\frac{A^2}{2}$$

represents a distortion term. The ratio of the desired signal to the distortion is therefore $$\text{Distortion} \approx \frac{a^3}{2a_2} \frac{B^2}{A} \quad (6)$$

It is noted that the distortion may be made of very small magnitude by letting A be much greater than B. Had the frequency of the reference signal been the same as the frequency of the chroma subcarrier, the above ratio of Equation 6 would have included a term $$\frac{A}{B}$$

rather than $$\frac{B^2}{A}$$

It is therefore evident that the distortion component for the case where the reference signal frequency and the chroma subcarrier frequency are the same, is much greater than that for the case where the reference frequency is a subharmonic of the chroma subcarrier frequency.

The low distortion inherent in the use of a subharmonic reference signal can be explained in the following way. The color difference signal information has a frequency range from 0 to 1½ mcs. The chroma therefore contains this color difference signal information in the form of side frequencies in the range from 2.2 to 4.2 mcs. The product of the chroma and a reference signal having the chroma subcarrier frequency will provide distortion terms representing the mixing or beating of the reference signal with each of the side frequencies of the chroma signal to develop important distortion components which will fall in the frequency range of the demodulated color difference signal information. When the reference signal is a subharmonic, having, for example, a frequency of 1.79 mcs. as compared to the frequencies of the important color difference signal side frequencies which occur in the vicinity of 3.58 mcs., the mixing of these signals will produce important distortion terms in the vicinity of the difference in frequency between the reference signal frequency and the chroma subcarrier frequency. This difference in frequency is also 1.79 mcs.; many of the distortion terms are therefore situated in a range of much higher frequencies than the frequencies of the demodulated color difference signal information.

The preceding discussion has described the operation of one form of synchronous demodulator 10 which yields product detection. It is to be appreciated that alternatively the chroma and the reference signal may be applied to other electrodes of the tube 19. For example, the chroma may be applied to the control grid and the reference signal to the cathode or vice-versa. In a multielectrode type of tube, the chroma and reference signal may be applied to different control electrodes of the demodulator tube. Actually, the chroma and reference signals may be heterodyned across any nonlinear impedance having a square law characteristic. Other nonlinear impedances include the diodes and rectifiers.

It is to be noted from Equation 5 that the phase of the demodulated low frequency components is a function of twice the phase angle of the reference signal and of the phase angle of the subcarrier of the chroma. It is therefore necessary to properly phase the reference signal with a phase which is related to the phase of the desired color difference signal in the chroma. As an example of the choice of phases of the subharmonic reference signal used for the demodulation of one or more signals from a chrominance signal, consider the case where the chrominance signal is demodulated in each of a pair of synchronous demodulators; each of the synchronous demodulators is subjected to synchronous demodulation by a reference signal having a subharmonic of the frequency of the subcarrier of the chrominance signal.

The circuit of Figure 2 is such a demodulator circuit involving synchronous demodulators 10′ and 10″. Each synchronous demodulator utilizes circuit components which correspond to those which were described in connection with the synchronous demodulator 10 of Figure 1. In the synchronous demodulators of Figure 2, the circuit components corresponding to those of the synchronous demodulators 10′ and 10″ are assigned corresponding numerals having primes which relate to the particular synchronous demodulator involved. A half frequency reference signal is applied to a phase shifter 20 to produce phases $\theta_1$ and $\theta_2$ of the subharmonic frequency across the resonant circuits 15′ and 15″, respectively. The reference signals having phases $\theta_1$ and $\theta_2$ are applied to the control grids of tubes 19′ and 19″, respectively.

The chrominance signal or chroma, developed across resonant circuit 13, is applied to each of the control grids of tubes 19′ and 19″. Color difference signals corresponding to the subharmonic phases $\theta_1$ and $\theta_2$ will be developed across the output loads 21′ and 21″, respectively.

The characteristics of the demodulated color difference signals, termed $e_{o1}$ and $e_{o2}$ may be illustrated by the following development. Let the chroma be described as $e_c$ where $$e_c=\sqrt{I^2+Q^2}\sin\left(\omega_c t+\tan^{-1}\frac{Q}{I}\right) \quad (7)$$

The I and Q components relate respectively to orange-cyan and green-purple information which is included in the chroma signal. The phase of the I signal information lags the burst phase by 57°; the phase of the Q signal lags the phase of the I signal by 90°. As set forth, $e_c$ implies a reference or zero phase of the chroma subcarrier at the phase of the I component.

Let the chrominance signal described by Equation 7 be demodulated by the subharmonic demodulating signals $e_{s1}$ and $e_{s2}$ having the phases $\theta_1$ and $\theta_2$ of the subharmonic frequency, respectively; that is, $$e_{s1}=B_1\sin(\tfrac{1}{2}\omega_c t+\theta_1) \quad (8)$$

$$e_{s2}=B_2\sin(\tfrac{1}{2}\omega_c t+\theta_2) \quad (9)$$

The demodulated signals provided by synchronous demodulators 10′ and 10″ are thereupon expressible as $e_{o1}$ and $e_{o2}$ where $$e_{o_1}=\frac{-a_3B_1^2\sqrt{I^2+Q^2}}{4}\sin\left[\tan^{-1}\frac{Q}{I}-2\theta_1\right] \quad (10)$$

$$e_{o_2}=\frac{-a_3B_2^2\sqrt{I^2+Q^2}}{4}\sin\left[\tan^{-1}\frac{Q}{I}-2\theta_2\right] \quad (11)$$

It follows that the color difference signals $e_{o1}$ and $e_{o2}$ will be functions of the phase angles $2\theta_1$ and $2\theta_2$, respectively.

Assume by way of illustration that $$\theta_1-\theta_2=\frac{\pi}{4}=45° \quad (12)$$

and that $\theta_1$ is equal to −57°. It can be shown from Equations 10 and 11 that $e_{o1}$ will correspond to color difference signal information at a phase angle lagging the I signal phase in the chrominance signal by 33° and that $e_{o2}$ will correspond to color difference signal information having a phase in the chrominance signal lagging the Q signal phase by 30°. $e_{o1}$ and $e_{o2}$ are therefore the so-called red $(R-Y)$ and blue $(B-Y)$ color difference signals, each of which, when combined with the luminance or Y signal which is included in the color television signal, produces a corresponding component color signal; for example, the combination of the $R-Y$ signal with the Y signal will produce an R or red component color signal.

It is noted from the preceding illustration that the use of a phase difference of 45° between two subharmonic reference or demodulating signals results in demodulated color difference signal information corresponding to modulations displaced by 90° in the chrominance signal.

In color television systems where a trio of component color signals are needed, say, R, B and G signals where G represents a green component color signal, it is often necessary to demodulate only a pair of color difference signals which can then be combined in correct polarities and magnitudes to produce a third color difference signal. A circuit of the type shown in Figure 2 is therefore highly useful; for example, it can be shown that a green color difference signal, namely $G-Y$, can be formed from negative polarities of $R-Y$ and $B-Y$ color difference signal information according to the proportions:

$$G-Y=-.51(R-Y)-.19(B-Y) \qquad (13)$$

Figure 3 is a schematic diagram of another form of synchronous demodulator 10 which functions according to the present invention. The chroma developed across the resonant circuit 13 is applied to the anode of tube 19. The half frequency reference signal developed across resonant circuit 15 is applied to the control grid of tube 19 by way of a grid leak circuit 25. The action of the grid leak circuit 25 will be to develop a grid bias for tube 19 whereby tube 19 will conduct only during positive peaks of the subharmonic reference signal developed across resonant circuit 15. Tube 19 is therefore a cyclically pulsed nonlinear impedance which cause sampling of an applied signal.

A signal representing the amplitude of the chroma signal during each peak of the half frequency reference signal will be developed across the output load 21 and therefore at the output terminal 23. This signal will be a demodulated color difference signal corresponding to the phase of the reference signal. It is to be appreciated that the chrominance signal has been sampled during every other sinusoidal variation of the color difference signal information contained in the chroma. The tube 19 will therefore have an average current substantially less than that which would have resulted had the color difference signal information in the chroma been sampled during each sinusoidal variation, thereby resulting in a more efficient operation.

The synchronous demodulator 10 of Figure 3 may also be considered as producing cyclic conduction of tube 19 to provide a cyclically varying impedance load to the chroma developed across resonant circuit 13. This cyclically varying impedance will have square law characteristics and may be shown to provide a demodulated color difference signal across the output circuit 21 having reduced distortion.

Figure 4 is a diagram of a color television receiver including a schematic diagram of a subharmonic signal source wherein a phase of a subharmonic reference signal is synchronized by incoming color synchronizing bursts. The signal transmitter from a broadcast station is received at the antenna 41 and applied therefrom to the television signal receiver 43.

The television signal receiver 43 demodulates the television signal from the incoming signal. The demodulated color television signal includes the luminance signal, the chroma, the color synchronizing bursts, picture deflection synchronizing signals and also a sound modulated carrier which is transmitted 4½ mcs. removed from the picture carrier.

Using, for example, an intercarrier sound circuit, the sound information is demodulated from the sound modulated carrier in the audio detector and amplifier 45 and is applied in the form of an amplified sound signal, to the loud speaker 47.

The picture deflection synchronizing signals are separated from the color television signal in the deflection and high voltage circuits 49. Responsive to these picture deflection synchronizing signals, the deflection and high voltage circuits 49 develop horizontal and vertical deflection signals and a high voltage which are applied respectively to the deflection yokes 51 and to the ultor 53 of the color kinescope 55. The deflection synchronizing pulses in the deflection and high voltage circuits 49 are also utilized to energize a gate pulse generator 57 which develops a gate pulse 59 during the portion of each retrace interval which is normally occupied by the color synchronizing bursts.

The gate pulse 59 and the color television signal are applied to the burst separator 61 which separates the bursts from the color television signal and applies the separated bursts to the burst-synchronized subharmonic signal source 63. The burst-synchronized subharmonic signal source produces, say, a half-frequency burst-synchronized reference signal which is thereupon applied to the phase shift circuits 65.

The chrominance or chroma signal portion of the color television signal is separated from the color television signal and amplified in the chroma filter and amplifier 67. The output of the chroma filter and amplifier 67 is applied to the demodulator 69 to which is also applied appropriately phased subharmonic burst-synchronized reference signals from the phase shift circuit 65. The output of the demodulator 69 is typically a trio of color difference signals, namely, $R-Y$, $B-Y$ and $G-Y$ color difference signals which are applied to appropriate control electrodes of the color kinescope.

The color television signal, when not processed in synchronous demodulator circuits, comprises principally luminance signal information. This luminance or Y signal is thereupon amplified and delayed in the Y amplifier and delay line 68 and applied therefrom to the cathodes of the color kinescope 55. The color difference signals will each combine with the luminance signal in the corresponding electron beams of the color kinescope 55 to cause the televised color image to be reproduced by the color kinescope 55. It is to be appreciated that the combining of the luminance signal with each color difference signal can alternatively be achieved in separate adder circuits separate from the color kinescope.

The burst-synchronized subharmonic source 63 of the color television receiver of Figure 4 is shown in schematic form to illustrate a preferred, though not definitive, circuit for producing a subharmonic burst-synchronized reference signal in a color television receiver. The separated bursts, representing 3.58 mcs. reference-phase information, is applied to the cathode of diode 71 and to the anode of diode 73. An oscillator, involving a tube 75, a grid resonant circuit 77 and a feedback system from screen grid to control grid using the piezo-electric crystal 79, develops oscillations at the subharmonic frequency 1.79 mcs. The grid resonant circuit 77 and the piezo-electric crystal 79 are resonant at the subharmonic frequency. A resonant circuit 81, coupled to the anode of tube 75, is also resonant at the subharmonic frequency and, responsive to the subharmonic frequency oscillations produced in the electron stream of tube 75, develops oscillations at the subharmonic frequency.

A pair of 180° out-of-phase subharmonic frequency signals are derived from the resonant circuit 81. One signal, derived directly from a winding of the inductance 83 of the resonant circuit 81, is applied by way of condenser 85 to the anode of diode 71. A winding 87, inductively coupled to the inductance 83, applies a 180° out-of-phase signal, relative to the phase of signal applied to the anode of diode 71, to the cathode of diode 73 by way of condenser 89. A resistance network 91 and an integrating circuit 93 are connected from the anode of diode 71 and the cathode of diode 73 to ground. The 3.58 mcs. bursts and the 1.79 mcs. oscillations are thereupon mixed and compared in the diodes 71 and 73 and a continuous voltage is developed across the integrating circuit 93; this voltage is a control voltage which is indicative of the phase relationship between the phase of the bursts and the phase of the subharmonic oscillations developed in tube 75.

The control signal developed across integrating circuit 93 is applied by way of the inductance 95 and the resistance 97 to the control grid of the reactance tube 99 which is coupled in shunt with the grid resonant circuit 77 of the tube 75. The reactance tube 99, responsive to the control voltage developed across the integrating circuit 93, thereupon controls the frequency and phase of the oscillations developed in the grid resonator 77 and therefore in the resonant circuit 81.

The burst-synchronized 1.79 mc. oscillations developed by the burst-synchronized subharmonic signal source 63 are thereupon coupled by means of winding 100, from resonant circuit 81 to the phase shift circuits 65; the phase shift circuits thereupon apply properly phased burst-synchronized subharmonic demodulating signals to the demodulator 69.

Figure 5 is a diagram of another circuit for practising the present invention. The circuit of Figure 5 uses a phase-locked 3.58 mc. signal source 111 which is phase synchronized by the separated bursts. The output signal of the phase-locked 3.58 mc. signal source 111 is an oscillatory signal having the frequency of the separated bursts. The oscillatory signal is thereupon applied to the frequency divider 113 which produces the desired *n*th subharmonic wave having a frequency 3.58/N; this subharmonic wave is also phase synchronized by the separated bursts. The *n*th subharmonic wave is thereupon applied to the phase shift circuits 65. The output of the phase shift circuits 65 consists of a plurality of *n*th subharmonic demodulating reference signals of different phases; this plurality of subharmonic reference signals is thereupon applied to the demodulators 69 to demodulate $R-Y$, $B-Y$ and $G-Y$ color difference signals from the chrominance signal.

Having described the invention, what is claimed is:

1. In a color television receiver adapted to receive a color television signal including a chrominance signal and also color synchronizing bursts having prescribed frequency and phase, the combination of: means for separating said bursts from said color television signal; means coupled to said burst separating means and responsive to said separated bursts for developing an oscillatory signal continuous at least between bursts and having a frequency lower than the frequency of said bursts and a phase related to signal information in said chrominance signal; and means coupled to said oscillatory signal developing means and responsive to said oscillatory signal and to said chrominance signal for demodulating said chrominance signal to recover said signal information.

2. In a color television receiver adapted to receive a color television signal including color synchronizing bursts having prescribed frequency and phase and also a chrominance signal including modulations representative of a plurality of color difference signals each at a phase of said chrominance signal, the combination of: means for separating said bursts from said color television signal; means coupled to said burst separating means for employing said separated bursts to develop a reference signal having a frequency equal to a subharmonic of said prescribed burst frequency and phase synchronized by said bursts; means for deriving said chrominance signal from said color television signal; and demodulator means coupled to said chrominance signal deriving means and to said separated burst employing means and responsive to said chrominance signal and to selected phases of said reference signal for developing a group of color television signals.

3. In a color television receiver adapted to receive a color television signal including color synchronizing bursts having prescribed frequency and phase and also a chrominance signal including modulations representative of a plurality of color difference signals each at a phase of said chrominance signal, the combination of: means for separating said bursts from said color television signal; oscillator means coupled to said burst separating means and responsive to said separated bursts for developing a reference signal having half the frequency of said prescribed burst frequency and phase synchronized by said bursts; means for deriving said chrominance signal from said color television signal; and demodulator means coupled to said chrominance signal deriving means to said oscillator means and responsive to said chrominance signal and to selected phases of said reference signal for developing a predetermined group of color television signals.

4. A color television receiver adapted to receive a color television signal including color synchronizing bursts having prescribed frequency and phase and also a chrominance signal including modulations representative of a plurality of color difference signals each at a phase of said chrominance signal, the combination of: means for separating said bursts from said color television signal; means coupled to said burst separating means and responsive to said separated bursts for developing a reference signal having a frequency which is a subharmonic of said burst frequency and phase synchronized by said separated bursts; a demodulator device having an electron flow and characterized by a nonlinear relationship between the magnitude of said electron flow with respect to the magnitude of applied signals which are introduced as modulations into said electron flow; means for deriving said chrominance signal from said color television signal; means coupled between said demodulator device and said chrominance signal deriving means and said reference signal developing means for introducing modulations representative of said chrominance signal and said reference signal into said electron flow; and means coupled to said demodulator device and responsive to said modulations representative of said chrominance and reference signals introduced into said electron flow for developing a color difference signal corresponding to a predetermined phase of said reference signal.

5. In a color television receiver providing a source of a color television signal including color synchronizing bursts having prescribed frequency and phase and also a chrominance signal including modulations representative of a plurality of color difference signals each at a phase of said chrominance signal, the combination of: means coupled to said color television signal source for separating said bursts from said color television signal; means coupled to said burst separating means and responsive to said separated bursts for developing a burst synchronized reference signal having a frequency that is a subharmonic of said burst frequency; an electron flow device having an electron flow; means coupled between said source and said electron flow device for introducing modulations representative of said chrominance signal into said electron flow; means coupled between said reference signal developing means and said electron flow device and responsive to said reference signal for causing cyclic intermittent conduction of said electron flow at a given phase of said reference signal; and means coupled to said electron flow device and responsive to the signal interaction resulting from said intermittent conduction of said chrominance signal modulated electron flow for producing a color difference signal corresponding to a phase of said chrominance signal related to said given phase of said reference signal.

6. In a color television receiver adapted to receive a color television signal including color synchronizing bursts having prescribed frequency and phase and also a chrominance signal including modulations representative of a plurality of color difference signals each at a phase of said chrominance signal, the combination of: means for separating said bursts from said color television signal; an oscillator having a resonant circuit in which are developed oscillations at a subharmonic of said burst frequency; means for comparing the phase of said separated bursts and the phase of said oscillator oscillations to develop a control signal indicative of the timing relationship between said separated bursts and said oscillator oscillations; and frequency and phase control means responsive to said control signal and coupled to said resonant circuit for controlling the phase and frequency of said oscillator oscillations.

7. In a color television receiver including a source of a color television signal including color synchronizing bursts having prescribed frequency and phase and also a chrominance signal including modulations representative of a plurality of color difference signals each at a phase of said chrominance signal, the combination of: means coupled to said color television signal source for separating said bursts from said color television signal; means coupled to said burst separating means and responsive to said separated bursts for developing a burst-synchronized signal having a frequency one-half of said burst frequency; means coupled to said signal developing means for deriving a pair of half-burst-frequency reference signals having a prescribed phase difference from said burst-synchronized signal; means coupled to said source for deriving said chrominance signal from said color television signal; synchronous demodulation means coupled to said chrominance signal deriving means and to said reference signal deriving means and responsive to said chrominance signal and to said pair of half-burst-frequency reference signals for developing from said-chrominance signals a pair of color difference signals corresponding to phases in said chrominance signal separated by a phase difference equal to twice said prescribed phase difference.

8. In a color television receiver providing a source of a color television signal including a chrominance signal component comprising a modulated color subcarrier and including color synchronizing bursts of color subcarrier frequency in reference phase, the combination of means coupled to said source for selectively deriving said chrominance signal component from said color television signal; oscillator means for providing an output signal having a frequency nominally equal to a subharmonic of a color subcarrier frequency; means coupled to said oscillator means and responsive to said color synchronizing bursts for controlling the frequency and phase of said oscillator means output signal to maintain synchronism between said oscillator output signal and said color synchronizing bursts; said controlling means comprising a phase detector for comparing in phase said color synchronizing bursts and said subharmonic frequency output signal to derive a control voltage, and means for utilizing said control voltage to vary the tuning of said oscillator means; and demodulator means coupled to said chrominance signal component deriving means and to said oscillator means for utilizing said subharmonic frequency output signal to recover a color informative signal from said chrominance signal.

References Cited in the file of this patent

UNITED STATES PATENTS

| | | |
|---|---|---|
| 2,680,147 | Rhodes | June 1, 1954 |
| 2,725,422 | Stark | Nov. 29, 1955 |
| 2,728,812 | Bedford | Dec. 27, 1955 |
| 2,766,321 | Parker | Oct. 9, 1956 |
| 2,790,848 | Koch | Apr. 30, 1957 |
| 2,802,045 | Landon | Aug. 6, 1957 |